(12) United States Patent
Lin et al.

(10) Patent No.: US 10,788,288 B2
(45) Date of Patent: Sep. 29, 2020

(54) SIGHT AND COMPENSATING MECHANISM THEREOF

(71) Applicants: Sintai Optical (Shenzhen) Co., Ltd., ShenZhen, Guandong Province (CN); Asia Optical Co., Inc., Taichung (TW)

(72) Inventors: Yung-Chin Lin, Taichung (TW); Hao Tu, Taichung (TW); Sung-Po Cheng, Taichung (TW)

(73) Assignees: SINTAI OPTICAL (SHENZHEN) CO., LTD., Shenzhen, Guangdong Province (CN); ASIA OPTICAL CO., INC., Taichung (TW)

( * ) Notice: Subject to any disclaimer, the term of this patent is extended or adjusted under 35 U.S.C. 154(b) by 0 days.

(21) Appl. No.: 16/365,924

(22) Filed: Mar. 27, 2019

(65) Prior Publication Data
US 2019/0219363 A1    Jul. 18, 2019

Related U.S. Application Data

(62) Division of application No. 15/854,927, filed on Dec. 27, 2017, now Pat. No. 10,337,831.

(30) Foreign Application Priority Data

Dec. 28, 2016 (CN) .......................... 2016 1 1238779
Dec. 15, 2017 (CN) .......................... 2017 1 1344653

(51) Int. Cl.
*F41G 1/38* (2006.01)
*G02B 23/14* (2006.01)
*G02B 7/02* (2006.01)

(52) U.S. Cl.
CPC .............. *F41G 1/38* (2013.01); *G02B 7/023* (2013.01); *G02B 23/14* (2013.01)

(58) Field of Classification Search
CPC ....................................................... F41G 1/38
See application file for complete search history.

(56) References Cited

U.S. PATENT DOCUMENTS 4,247,161 A  *  1/1981  Unertl, Jr. .............. G02B 27/36
                                                           359/424
6,351,907 B1 *  3/2002  Otteman ................... F41G 1/38
                                                            42/120

(Continued)

FOREIGN PATENT DOCUMENTS

CN          105806156 A       7/2016
DE       102011013456 A1 *    9/2012    .............. F41G 1/44
WO      WO-2012119574 A1 *    9/2012    .............. G02B 27/36

*Primary Examiner* — Joshua T Semick
(74) *Attorney, Agent, or Firm* — McClure, Qualey & Rodack, LLP

(57) ABSTRACT

A compensating mechanism includes a base, an adjusting unit, an adjusting cap and a stop unit. The adjusting unit is disposed on the base. The adjusting cap is configured to move the adjusting unit with respect to the base so as to form a first circumferential movement range. The stop unit includes a sliding element and a limiting element, wherein the limiting element includes a movement region, and the adjusting cap is configured to move the sliding element along the movement region so as to form a second circumferential movement range. A sum of a first central angle corresponding to the first circumferential movement range and a second central angle corresponding to the second circumferential movement range is a fixed value. A sight is provided to include a main body, an objective unit, an ocular unit, an inner lens barrel and the compensating mechanism.

20 Claims, 13 Drawing Sheets

(56) References Cited

U.S. PATENT DOCUMENTS

| | | | |
|---|---|---|---|
| 8,919,026 B2 | 12/2014 | Hamilton | |
| 9,170,068 B2* | 10/2015 | Crispin | F41G 1/38 |
| 9,423,215 B2* | 8/2016 | White | F41G 1/16 |
| 9,677,848 B2* | 6/2017 | Hamilton | G02B 23/16 |
| 9,958,235 B2* | 5/2018 | Lassak | F41G 1/38 |
| 9,958,666 B2* | 5/2018 | Ingenito | G02B 7/023 |
| 10,132,593 B2 | 11/2018 | White et al. | |
| 2017/0211912 A1* | 7/2017 | Hamilton | F41G 1/38 |
| 2017/0328674 A1 | 11/2017 | VanBecelaere | |
| 2018/0347945 A1* | 12/2018 | Burianec | F41G 1/40 |
| 2019/0072363 A1* | 3/2019 | Kilic | F41G 1/38 |
| 2019/0376765 A1* | 12/2019 | Hamilton | G02B 7/023 |

\* cited by examiner

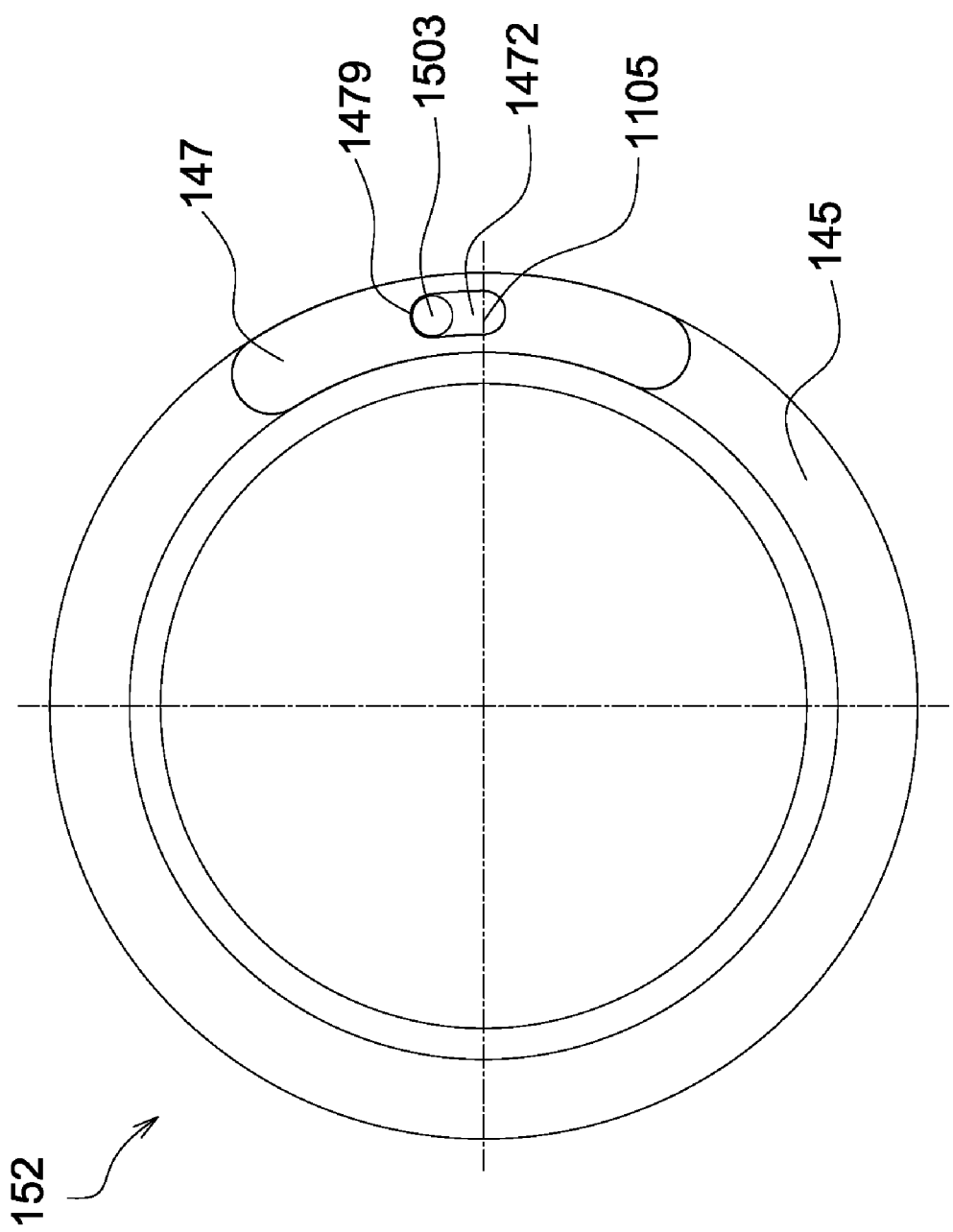

SIGHT AND COMPENSATING MECHANISM THEREOF

CROSS REFERENCE TO RELATED APPLICATIONS

This application is a Divisional of application Ser. No. 15/854,927, filed Dec. 27, 2017, now U.S. Pat. No. 10,337,831.

BACKGROUND OF THE INVENTION

Field of the Invention

The invention relates to a sight and compensating mechanism thereof, and more particularly to a compensating mechanism having a "zero stop" function.

Description of the Related Art

Generally, a conventional sight is provided with an elevation or windage compensating mechanism for correcting bullet impact points. Before bullet impact points are corrected, setting a zero point for the compensating mechanism is required wherein the zero point is set by adjusting an adjusting screw of the compensating mechanism to be in a reference position and adjusting an adjusting cap of the compensating mechanism to be in a zero-point position. After setting the zero point is completed, a user is able to operate the compensating mechanism to correct the bullet impact point. However, when correcting the bullet impact point for a new target at different distance is desired, adjusting the compensating mechanism back to the zero-point-set state may become difficult because the adjusting cap have been rotated a number of times.

To address the above problem, a prior compensating mechanism commonly has a "zero stop" function. If a return of the adjusting screw to the reference position is desired, a user only needs to rotate the adjusting cap in a reverse direction until the adjusting cap is stopped. The adjusting cap of the compensating mechanism is usually provided with a stop element (e.g. a pin) for achieving the described "zero stop" function. During rotation of the adjusting cap in the reverse direction, the adjusting cap is constrained by the stop element and stopped in the zero-point position so as to achieve the "zero stop" function.

In above described structure, the prior compensating mechanism achieves the "zero stop" function by means of the stop element. However, a new issue is caused. Specifically, the adjusting cap is constrained by the stop element and can be only rotated through an angle less than 360 degrees relative to the zero-point position. That is inconvenient in use.

BRIEF SUMMARY OF THE INVENTION

The invention provides a sight and compensating mechanism thereof The compensating mechanism has a "zero stop" function, and the adjusting cap of the compensating mechanism is stopped from rotating after a full rotation (360 degrees) in a single direction.

The compensating mechanism in accordance with an embodiment of the invention includes a base, an adjusting unit, an adjusting cap and a stop unit. The adjusting unit is disposed on the base. The adjusting cap is connected to the adjusting unit and is configured to rotate and move the adjusting unit with respect to the base so as to form a first circumferential movement range. The stop unit is connected to the base and includes a sliding element and a limiting element, wherein the limiting element includes a limiting portion, the limiting portion includes a movement region, and the adjusting cap is configured to move the sliding element along the movement region so as to form a second circumferential movement range. A sum of a first central angle corresponding to the first circumferential movement range and a second central angle corresponding to the second circumferential movement range is a fixed value. A value of the first central angle differs from that of the second central angle.

In yet another embodiment, the adjusting cap includes a gap, the gap has a first end and a second end, and the adjusting cap is configured to move the sliding element along the gap and between the first end and the second end. The limiting portion is a limiting slot, and the sliding element is configured to move along the limiting slot.

In another embodiment, the limiting slot has a third end and a fourth end, and the sliding element is configured to move along the limiting slot and between the third end and the fourth end.

In yet another embodiment, a first curved path along which the sliding element moves from the first end to the second end corresponds to the first circumferential movement range, a second curved path along which the sliding element moves from the third end to the fourth end corresponds to the second circumferential movement range, and the sum of the first central angle and the second central angle is 360 degrees.

In another embodiment, the adjusting cap is limited by the sliding element to rotate in a single direction when the sliding element is placed against both the first end of the gap and the third end of the limiting slot.

In yet another embodiment, the adjusting cap is limited by the sliding element to rotate in a reverse direction of the single direction when the sliding element is placed against both the second end of the gap and the fourth end of the limiting slot.

In another embodiment, the stop unit further includes a stop ring disposed around the base and having a sliding slot, wherein the sliding element includes a pin portion and a base portion, the base portion is movably disposed in the sliding slot, the pin portion movably penetrates through the limiting slot and into the gap, and the limiting element is firmly disposed on the stop ring.

In yet another embodiment, the compensating mechanism is an elevation compensating mechanism or a windage compensating mechanism.

In another embodiment, the compensating mechanism further includes a limiting bolt, an elastic element and a connecting element, wherein the limiting bolt penetrates through the elastic element and the connecting element and is fixed to the adjusting unit, the elastic element is compressed between the limiting bolt and the connecting element in an amount of compression and generates a restoring force, one end of the elastic element is disposed against a flange portion of the limiting bolt, the other end of the elastic element is disposed against a bottom portion of the connecting element, and the connecting element is forced against the adjusting unit by the restoring force.

The sight in accordance with an embodiment of the invention includes a main body, an objective unit, an ocular unit, an inner lens barrel and the compensating mechanism described above. The main body includes a first end portion and a second end portion. The objective unit is connected to the first end portion. The ocular unit is connected to the second end portion. The inner lens barrel is disposed within the main body and between the objective unit and the ocular unit and includes a plurality of lenses, wherein the objective unit, the inner lens barrel and the ocular unit constitute an optical axis. The compensating mechanism is disposed on the main body and against outer circumferential surfaces of the inner lens barrel so as to adjust the optical axis A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 6B is another schematic view of the pin portion of the FIG. 3 disposed in the limiting slot of the limiting element;

DETAILED DESCRIPTION OF THE INVENTION

Figure 1:
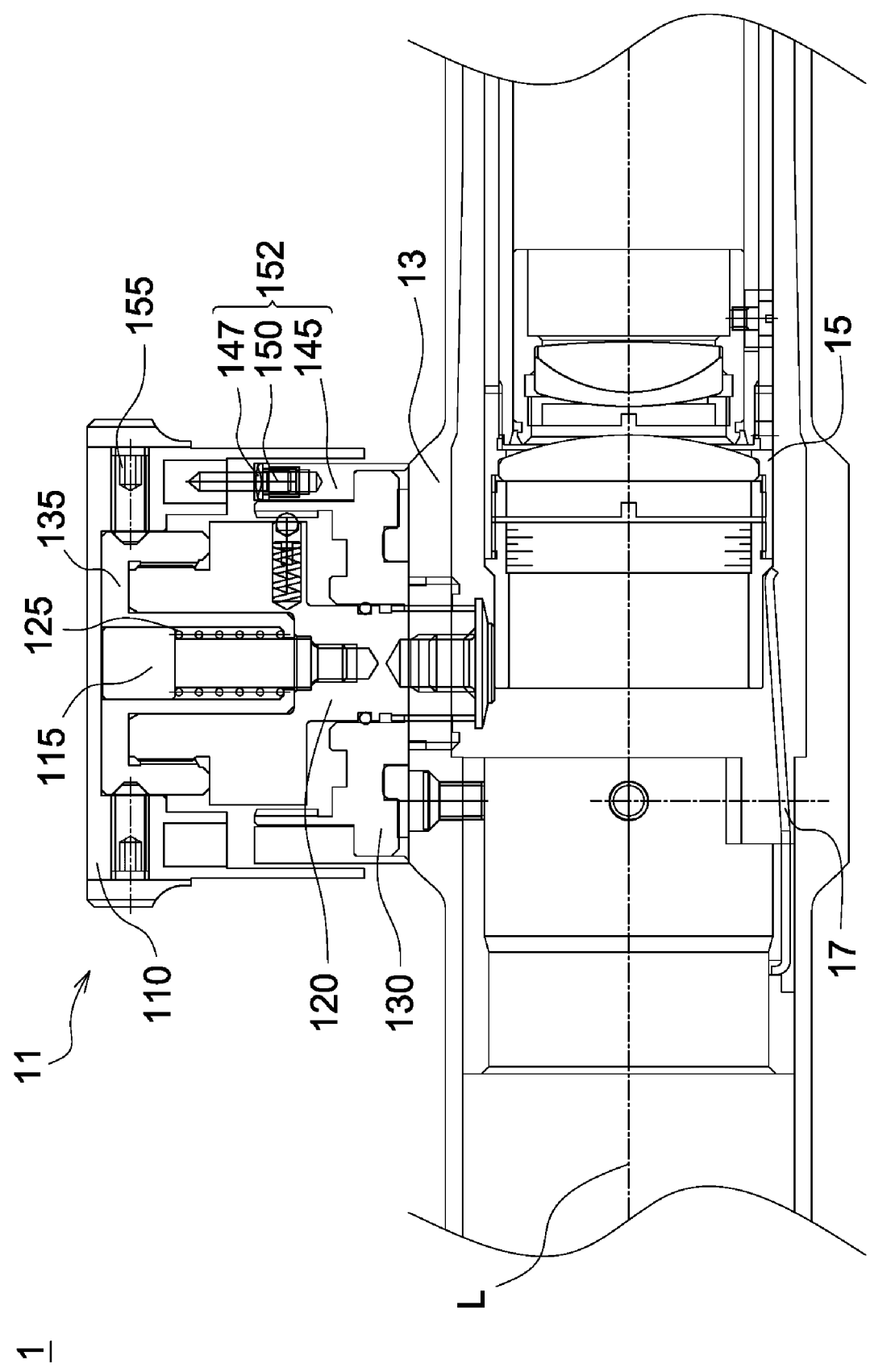
FIG. 1 is a side sectional view of a sight and compensating mechanism thereof in accordance with a first embodiment of the invention.
Figure 2:
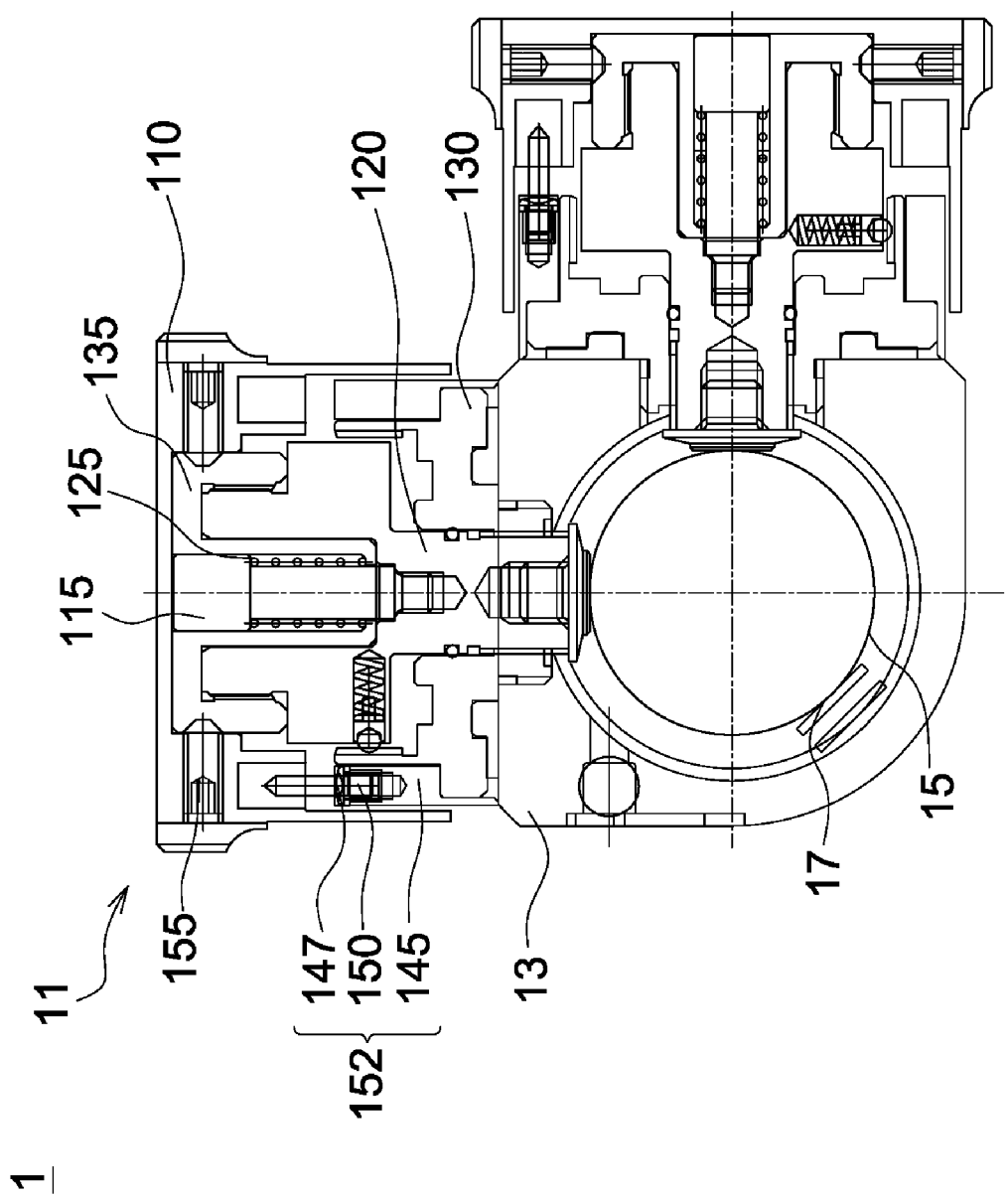
FIG. 2 is a front sectional view of the sight and compensating mechanism thereof in accordance with the first embodiment of the invention.

Referring to FIGS. 1 and 2, a sight 1 in accordance with a first embodiment of the invention includes a main body 13, a compensating mechanism 11, an objective unit (not shown), an ocular unit (not shown), an inner lens barrel 15 and an elastic element 17, and the compensating mechanism 11 includes a base 130, an adjusting unit 120, an adjusting cap 110 and a stop unit 152. The objective unit, the inner lens barrel 15 and the ocular unit constitute an optical axis L. The compensating mechanism 11 is configured to adjust an angle of the optical axis L relative to a central axis of the main body 13. Further, the compensating mechanism 11 is provided with a "zero stop" function. When a user rotates the adjusting cap 110 through 360 degrees in a single direction, the adjusting cap 110 is constrained and stopped. Afterwards, the user is able to rotate the adjusting cap 110 in a reverse direction of the single direction until the adjusting cap 110 is stopped and returns to a zero-point position. Moreover, the user is capable of switching the adjusting cap 110 between different positions for releasing the adjusting cap 110 from constraint after a full rotation (360 degrees).

The main body 13 has a front end portion (not shown) and a rear end portion (not shown). The objective unit is connected to the front end portion, and the ocular unit is connected to the rear end portion. As shown in FIGS. 1 and 2, the inner lens barrel 15 is disposed within the main body 13 and between the objective unit and the ocular unit and includes a plurality of lenses (not shown). The elastic element 17 is disposed on inner circumferential surfaces of the main body 13 and against the inner lens barrel 15. The compensating mechanism 11 is disposed on the main body 13 and penetrates into the main body 13 and against outer circumferential surfaces of the inner lens barrel 15 so as to adjust the optical axis L.

The base 130 is disposed on the main body 13 and has inner threads (not shown). The adjusting unit 120 is mated with the base 130 by the inner threads and penetrates into the main body 13 and against the outer circumferential surfaces of the inner lens barrel 15. The compensating mechanism 11 further includes a limiting bolt 115, an elastic element 125 and a connecting element 135. The limiting bolt 115 penetrates through the elastic element 125 and the connecting element 135 and is fixed to the adjusting unit 120. Therefore, the elastic element 125 is compressed between the limiting bolt 115 and the connecting element and generates a restoring force. One end of the elastic element 125 is disposed against a flange portion of the limiting bolt 115, and the other end of the elastic element 125 is disposed against a bottom portion of the connecting element 135. The connecting element 135 is forced against the adjusting unit 120 by the restoring force. In another embodiment, the adjusting unit is an adjusting element having a polygonal profile, and the above inner threads are replaced with a polygonal hole corresponding to the adjusting element so that the adjusting element can be fitted to the base. In yet another embodiment, the limiting bolt is a limiting member having a polygonal profile, and the adjusting unit has a polygonal hole corresponding to the limiting member so that the limiting member can be connected to the adjusting element.

Figure 3:
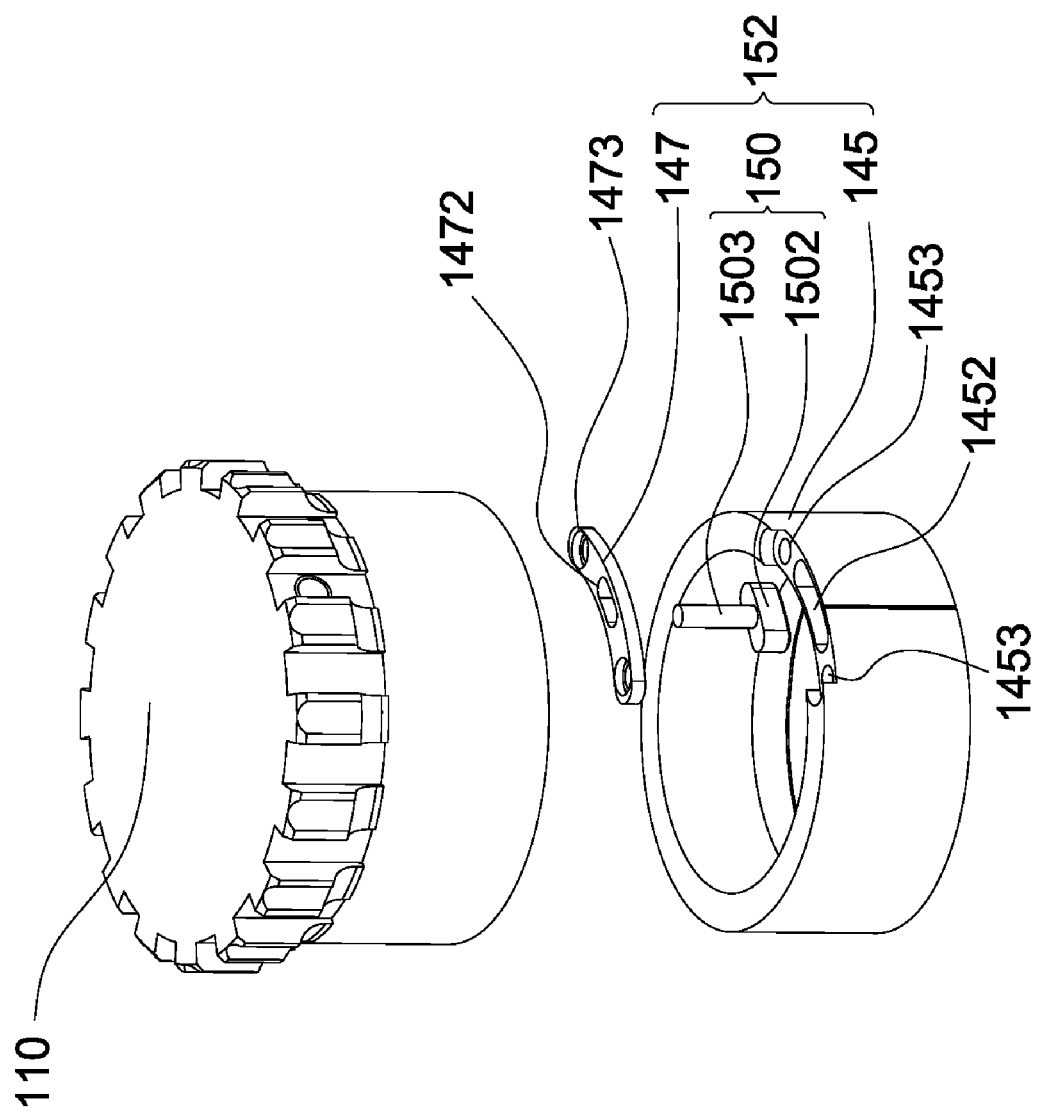
FIG. 3 is an exploded view of an adjusting cap and a stop unit of the compensating mechanism in accordance with the first embodiment of the invention.
Figure 4:
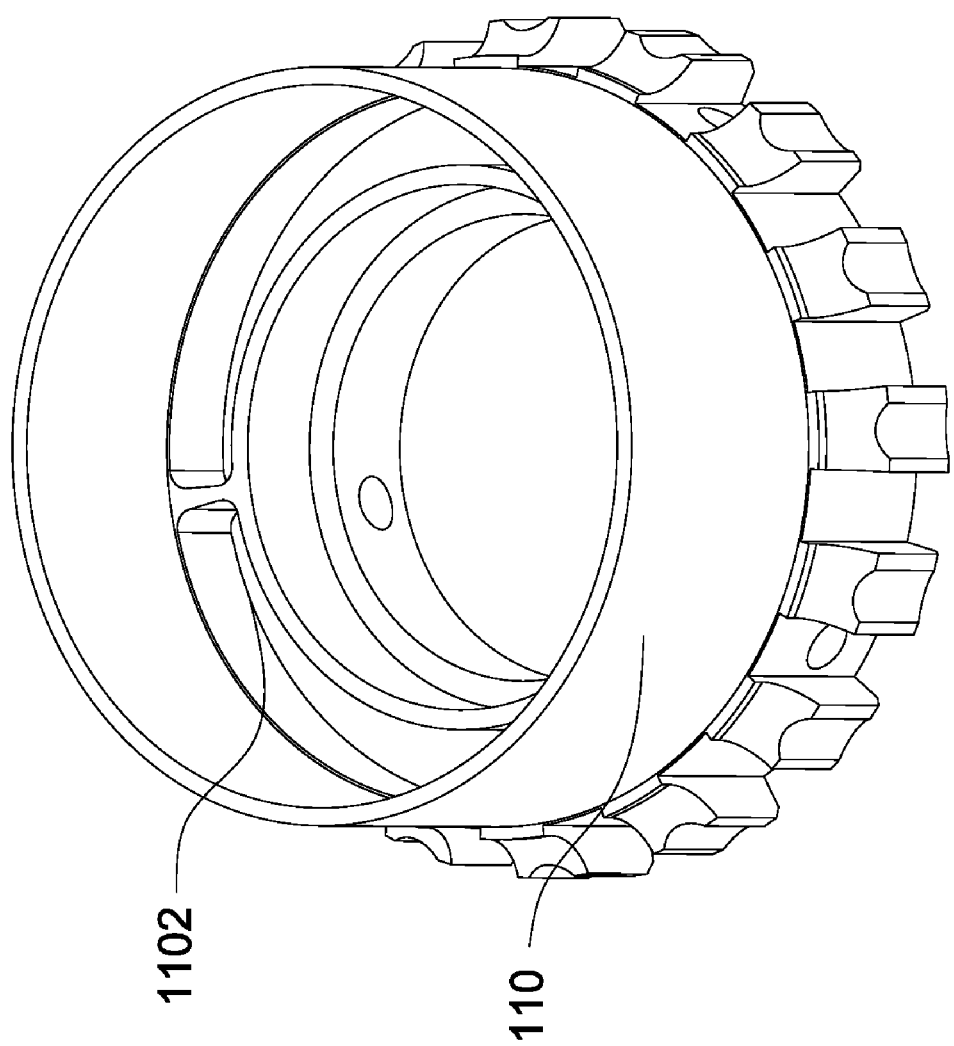
FIG. 4 is a schematic view of the adjusting cap of the FIG. 3, showing the interior thereof.

Referring to FIG. 3, the stop unit 152 includes a stop ring 145, a sliding element 150 and a limiting element 147. The stop ring 145 is disposed around the base 130 and is provided with a sliding slot 1452 and two threaded holes 1453. The limiting element 147 includes a limiting slot 1472 (or a limiting portion) and two through holes 1473. The sliding element 150 includes a base portion 1502 and a pin portion 1503, the base portion 1502 is movably disposed in the sliding slot 1452, and the pin portion 1503 movably penetrates through the limiting slot 1472. The stop unit 152 is further provided with two fixing screws (not shown). The fixing screws respectively penetrate through the through holes 1473 and are inserted into the threaded holes 1453 so that the stop ring 145, the sliding element 150 and the limiting element 147 are assembled to be a single piece. The sliding element 150 is configured to move in a circumferential direction of the stop ring 145 within a fixed distance (or along the limiting slot 1472). Referring to FIG. 4, the adjusting cap 110 is provided with a gap 1102 in a position corresponding to the stop ring 145. As shown in FIGS. 1 and 2, the compensating mechanism 11 further includes three fixing bolts 155, and the fixing bolts 155 penetrate through the adjusting cap 110 and against the connecting element 135 for connecting the adjusting cap 110 to the connecting element 135.

It is worth noting that the elastic element 125 is compressed in an amount of compression and generates the restoring force so that the adjusting cap 110 is generally forced by the restoring force to stay in a first position (as shown in FIGS. 1 and 2). When the adjusting cap 110 stays in the first position, the adjusting cap 110, the connecting element 135 and the adjusting unit 120 are linked and the pin portion 1503 penetrates into the gap 1102. Therefore, when the adjusting cap 110 is rotated, the adjusting cap 110 is able to rotate and move the adjusting unit 120 with respect to the base 130. Meanwhile, the pin portion 1503 is moved in the gap 1102 in a circumferential direction of the stop ring 145. However, when the adjusting cap 110 is pulled up by a force greater than the restoring force, the connecting element 135 is simultaneously pulled up and the elastic element 125 is further compressed. The adjusting cap 110 is allowed to move until the amount of compression reaches a predetermined value and is stopped in a second position (not shown). When the adjusting cap 110 stays in the second position, the adjusting cap 110, the connecting element 135 and the adjusting unit 120 are not linked and the pin portion 1503 is outside the gap 1102. In the first embodiment, the predetermined value is a maximal amount of compression of the elastic element 125. In another embodiment, the predetermined value is smaller than the maximal amount of compression of the elastic element 125. That is, the compensating mechanism 11 is allowed to operate as above description, even if the amount of compression of the elastic element 125 is smaller than the maximal amount.

In the first embodiment, the compensating mechanism 11 is an elevation compensating mechanism or a windage compensating mechanism, wherein the elevation compensating mechanism is usually disposed on a top side of the main body 13, and the windage compensating mechanism is usually disposed on a left or a right side of the main body 13.

Figure 5A:
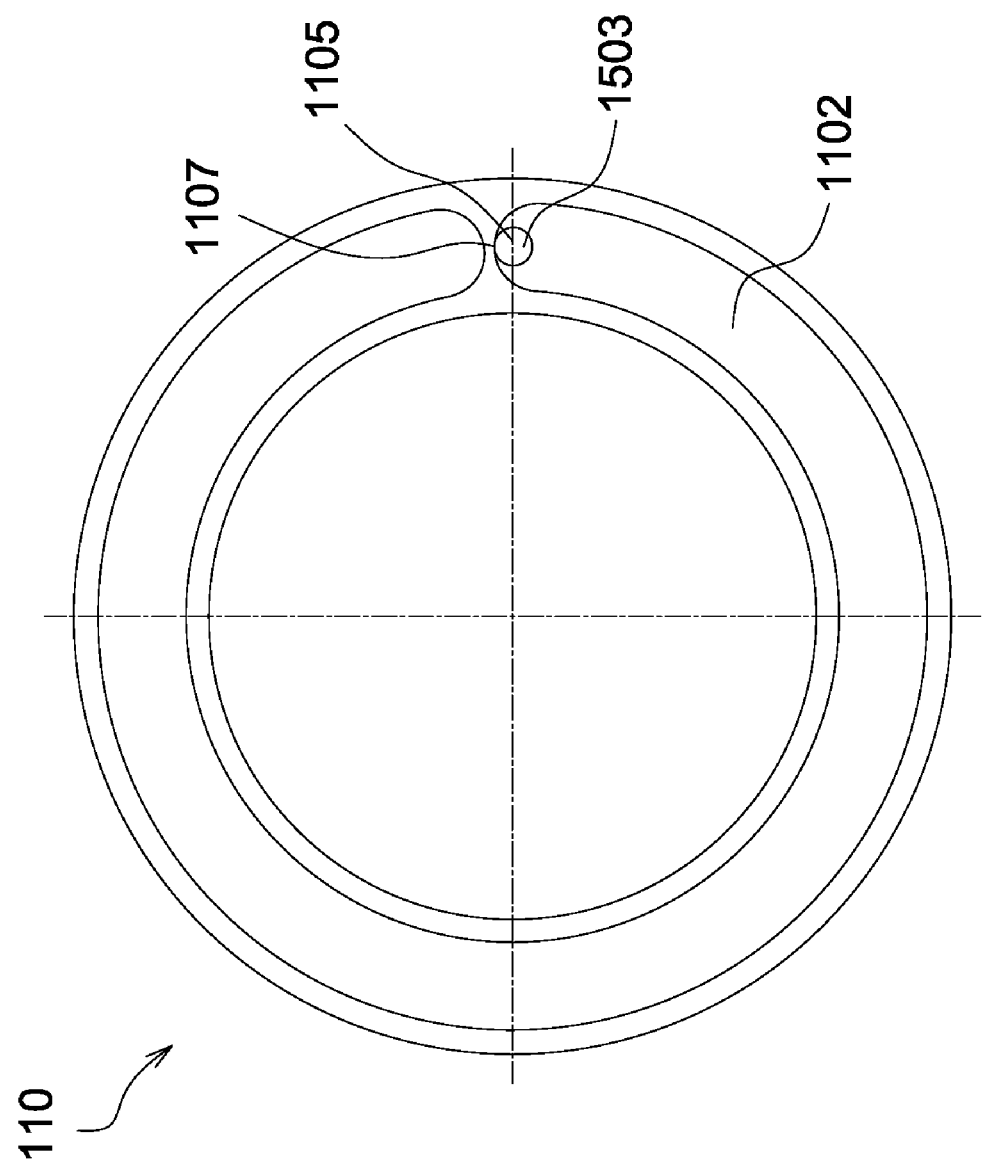
FIG. 5A is a schematic view of a pin portion of the FIG. 3 disposed in a gap of the adjusting cap.
Figure 5B:
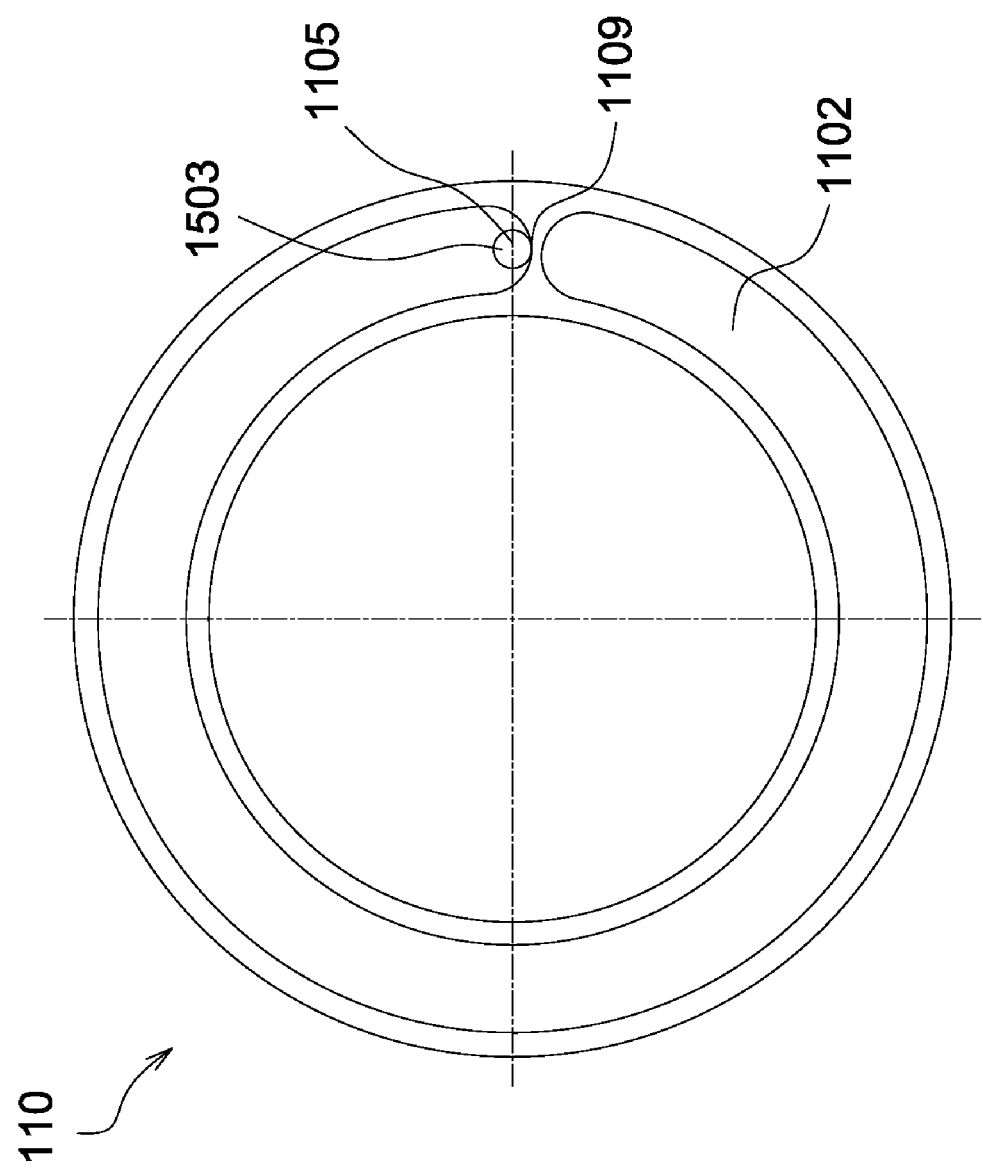
FIG. 5B is another schematic view of the pin portion of the FIG. 3 disposed in the gap of the adjusting cap.
Figure 5C:
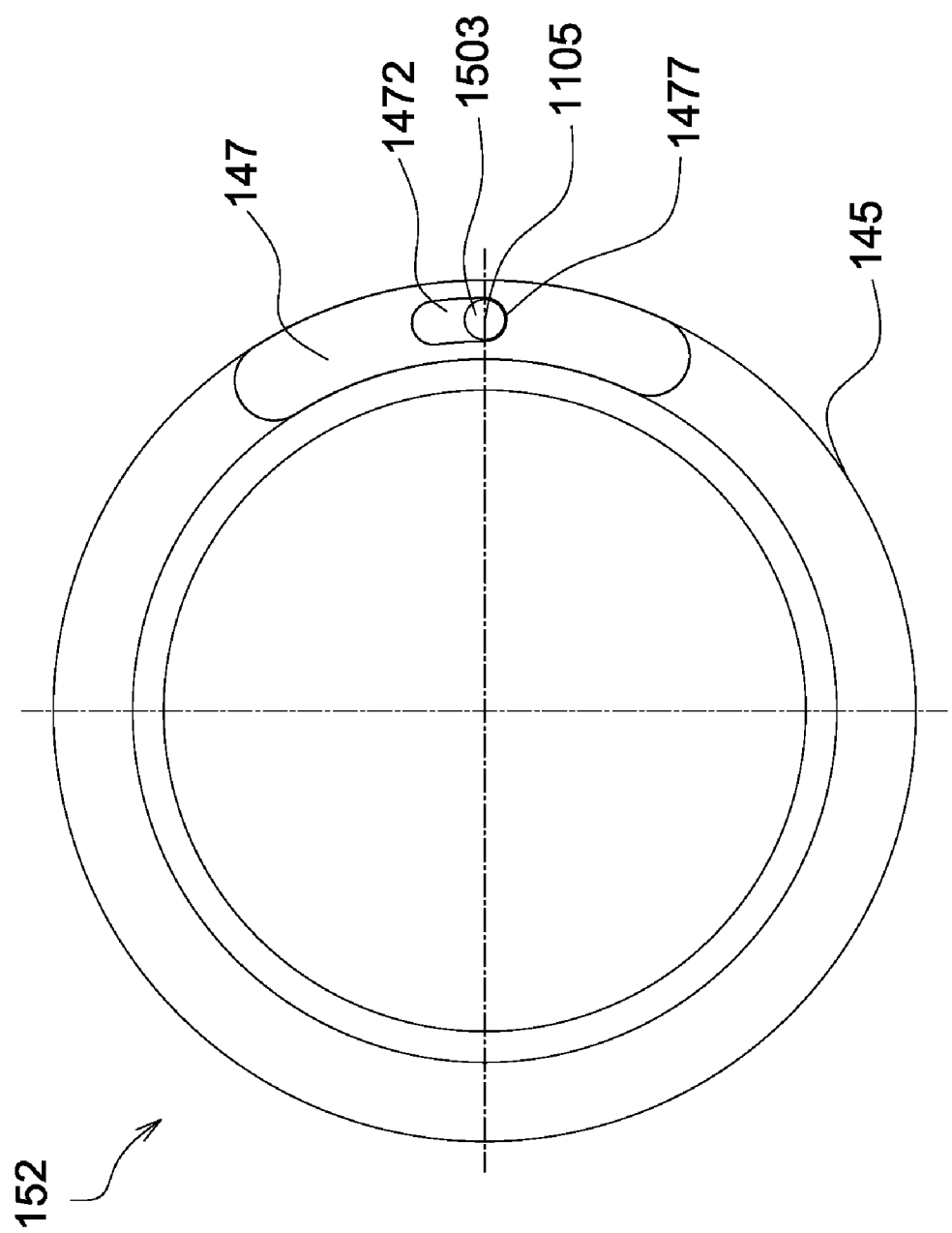
FIG. 5C is a schematic view of the pin portion of the FIG. 3 disposed in a limiting slot of a limiting element.
Figure 5D:
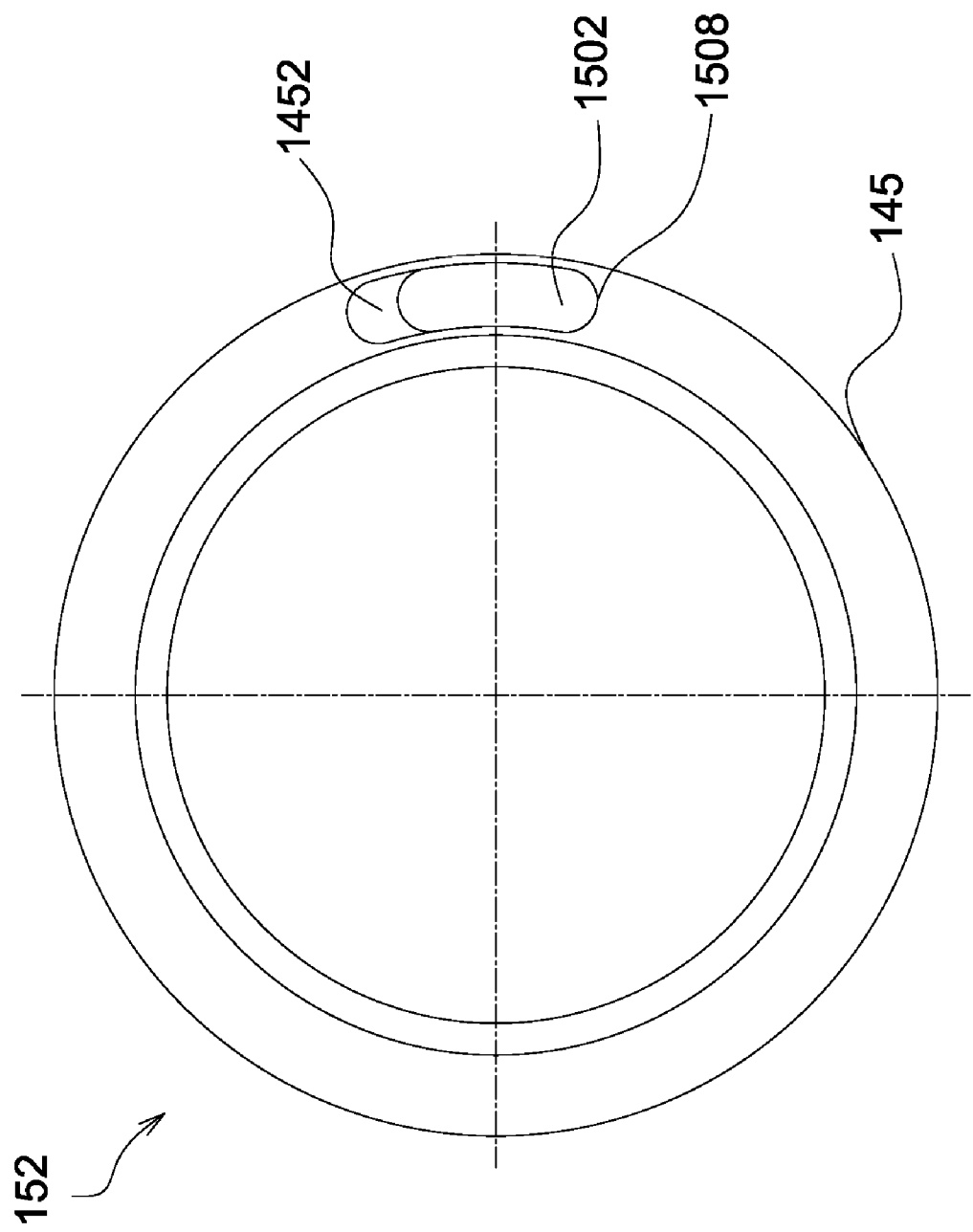
FIG. 5D is a schematic view of a base portion of the FIG. 3 disposed in a sliding slot of a stop ring.

Before bullet impact points are corrected, setting the zero point for the compensating mechanism 11 is required wherein the zero point is set by adjusting the adjusting unit 120 to be in a reference position and adjusting the adjusting cap 110 to be in a zero-point position. Referring to FIGS. 5A, 5C and 5D, when the adjusting cap 110 is placed in the zero-point position, the pin portion 1503 is placed in an initial position 1105 and against a first end 1107 of the gap 1102 as well as a third end 1477 of the limiting slot 1472, and the base portion 1502 is placed against a fifth end 1508 of the sliding slot 1452.

Figure 6A:
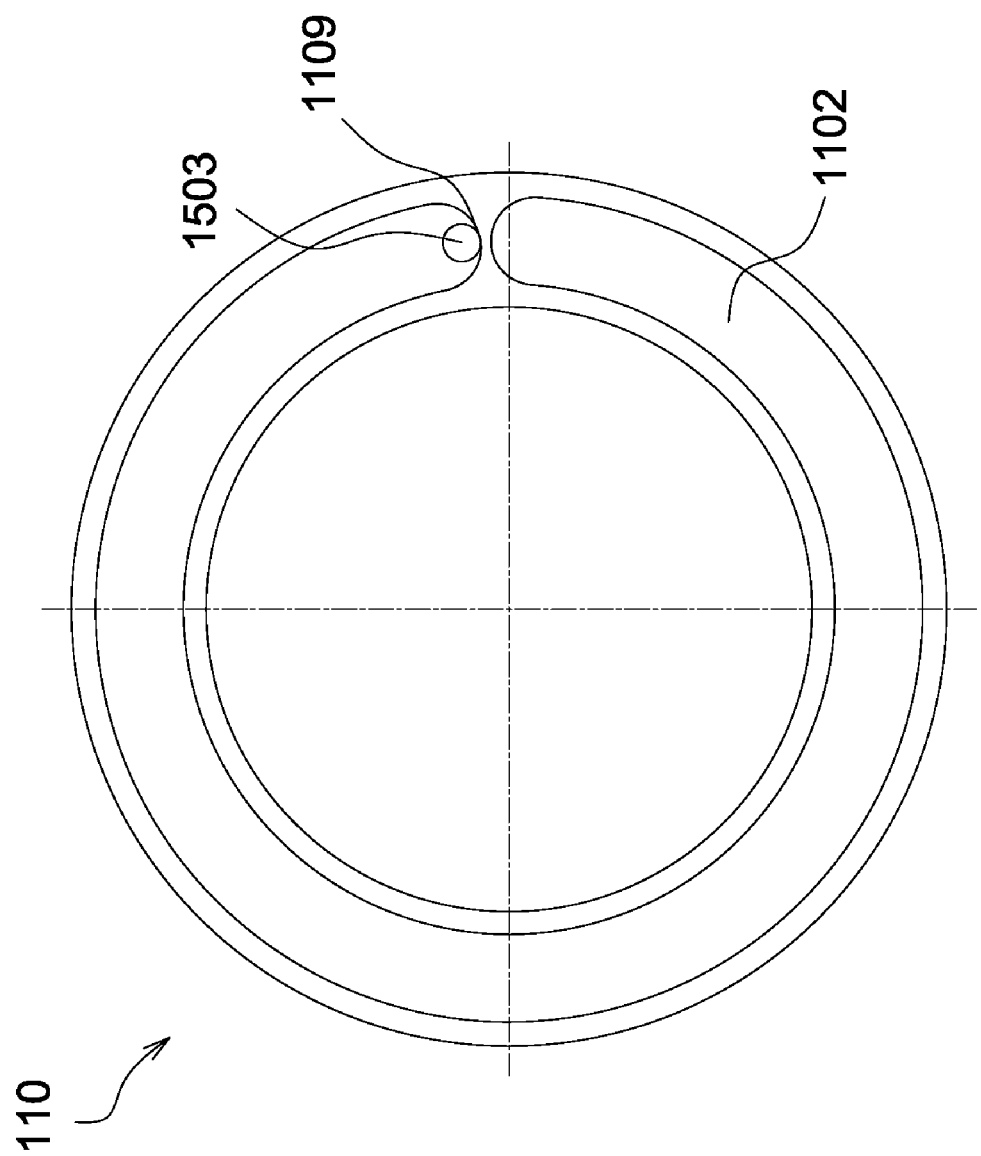
FIG. 6A is another schematic view of the pin portion of the FIG. 3 disposed in the gap of the adjusting cap.
Figure 6C:
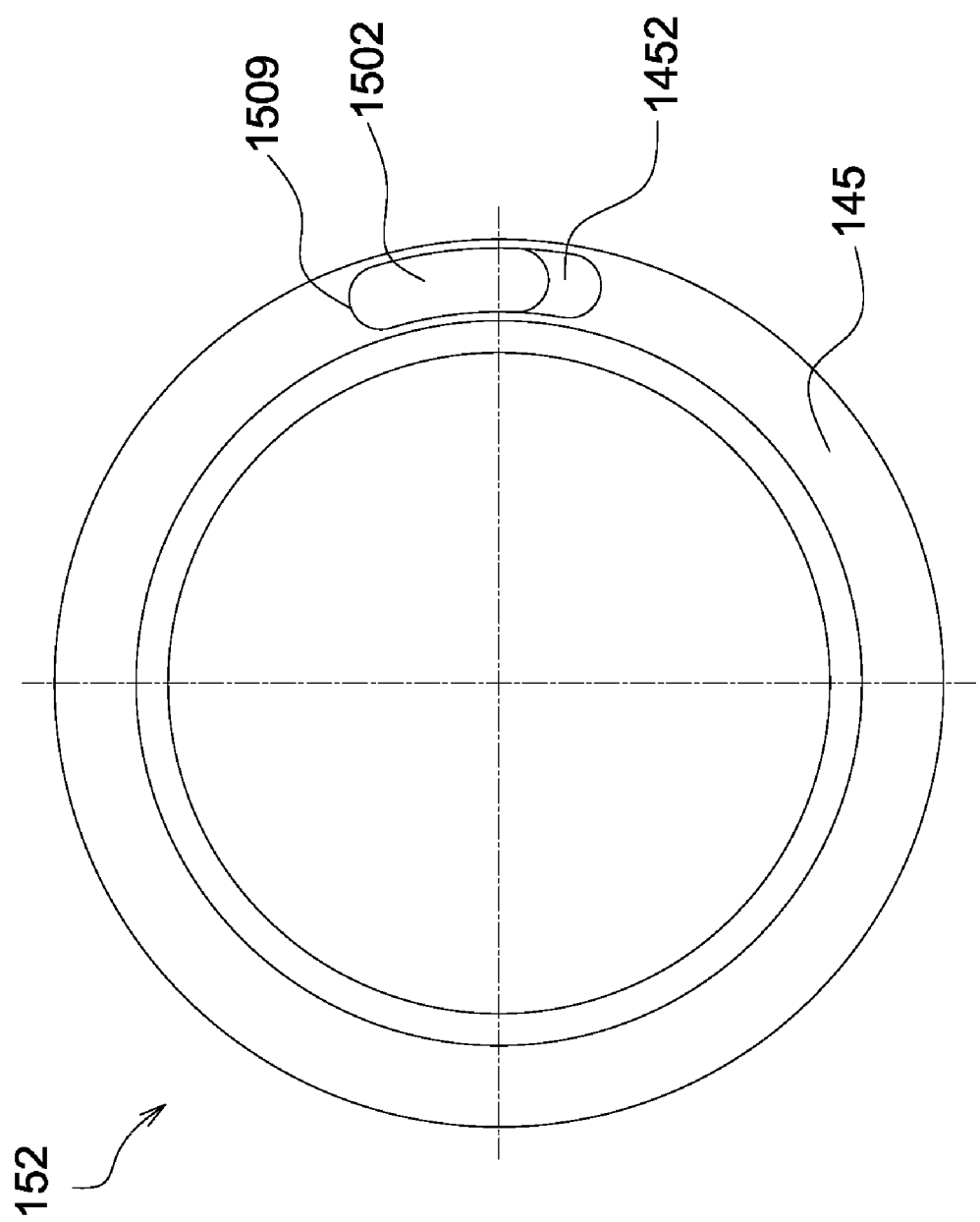
FIG. 6C is another schematic view of the base portion of the FIG. 3 disposed in the sliding slot of the stop ring.

In the beginning of operation of the compensating mechanism 11, the adjusting cap 110 is constrained by the stop unit 152 and can only be rotated in a single direction (e.g. in a clockwise or a counterclockwise direction). However, after the pin portion 1503 is moved away from the first end 1107, the constraint on the rotational direction of the adjusting cap 110 (i.e. in the single direction) is removed. During rotation of the adjusting cap 110 in the single direction, the pin portion 1503 is moved from the first end 1107 to a second end 1109 in the gap 1102. Referring to FIGS. 5B, 5C and 5D, when the pin portion 1503 is moved to push against the second end 1109 of the gap 1102 as well as the third end 1477 of the limiting slot 1472 and the base portion 1502 is still placed against the fifth end 1508 of the sliding slot 1452, the adjusting cap 110 is only rotated through an angle less than 360 degrees relative to the zero-point position. A full rotation (360 degrees) of the adjusting cap 110 can be completed by further rotating the adjusting cap 110 so that the second end 1109 of the gap 1102 forces the pin portion 1503 to move from the third end 1477 to a fourth end 1479 in the limiting slot 1472. Meanwhile, the base portion 1502 is moved from the fifth end 1508 to a sixth end 1509 in the sliding slot 1452. Referring to FIGS. 6A-6C, when the pin portion 1503 is moved to push against the second end 1109 of the gap 1102 as well as the fourth end 1479 of the limiting slot 1472 and the base portion 1502 is moved to push against the sixth end 1509 of the sliding slot 1452, the adjusting cap 110 is rotated through 360 degrees relative to the zero-point position and is unable to be further rotated in the single direction.

During the rotation of the adjusting cap 110, it is understood that the adjusting unit 120 is moved in an axial direction of the base 130 for pushing the inner lens barrel 15 so as to adjust the angle of the optical axis L relative to the central axis of the main body 13.

During above described operation, if adjusting the compensating mechanism 11 back to the zero-point-set state is desired, then the adjusting cap 110 is rotated in a reverse direction of the single direction until rotation of the adjusting cap 110 is blocked. When the pin portion 1503 is moved to push against the first end 1107 of the gap 1102 and the third end 1477 of the limiting slot 1472, the adjusting cap 110 is stopped in the zero-point position and is unable to be rotated in the reverse direction of the single direction, and the adjusting unit 120 is stopped in the reference position.

As above description, rotation of the adjusting cap 110 is constrained. That is, the adjusting cap 110 is blocked from rotating after a full rotation. If correcting bullet impact points is not completed yet, then the adjusting cap 110 can be pulled up to stop in the second position so that the adjusting cap 110, the connecting element 135 and the adjusting unit 120 are not linked and the pin portion 1503 is outside the gap 1102. Then, the adjusting cap 110 is rotated until the pin portion 1503 is placed in a position where the pin portion 1503 can push against the first end 1107 of the gap 1102 if the adjusting cap 110 returns to the first position. Then, the adjusting cap 110 is released so that the adjusting cap 110 returns to the first position by the restoring force of the elastic element 125, the adjusting cap 110, the connecting element 135 and the adjusting unit 120 are linked again, and the pin portion 1503 is placed against the first end 1107 of the gap 1102. Thus, the user can continue to rotate the adjusting cap 110 in the single direction for completion of correcting bullet impact points.

Figure 7A:
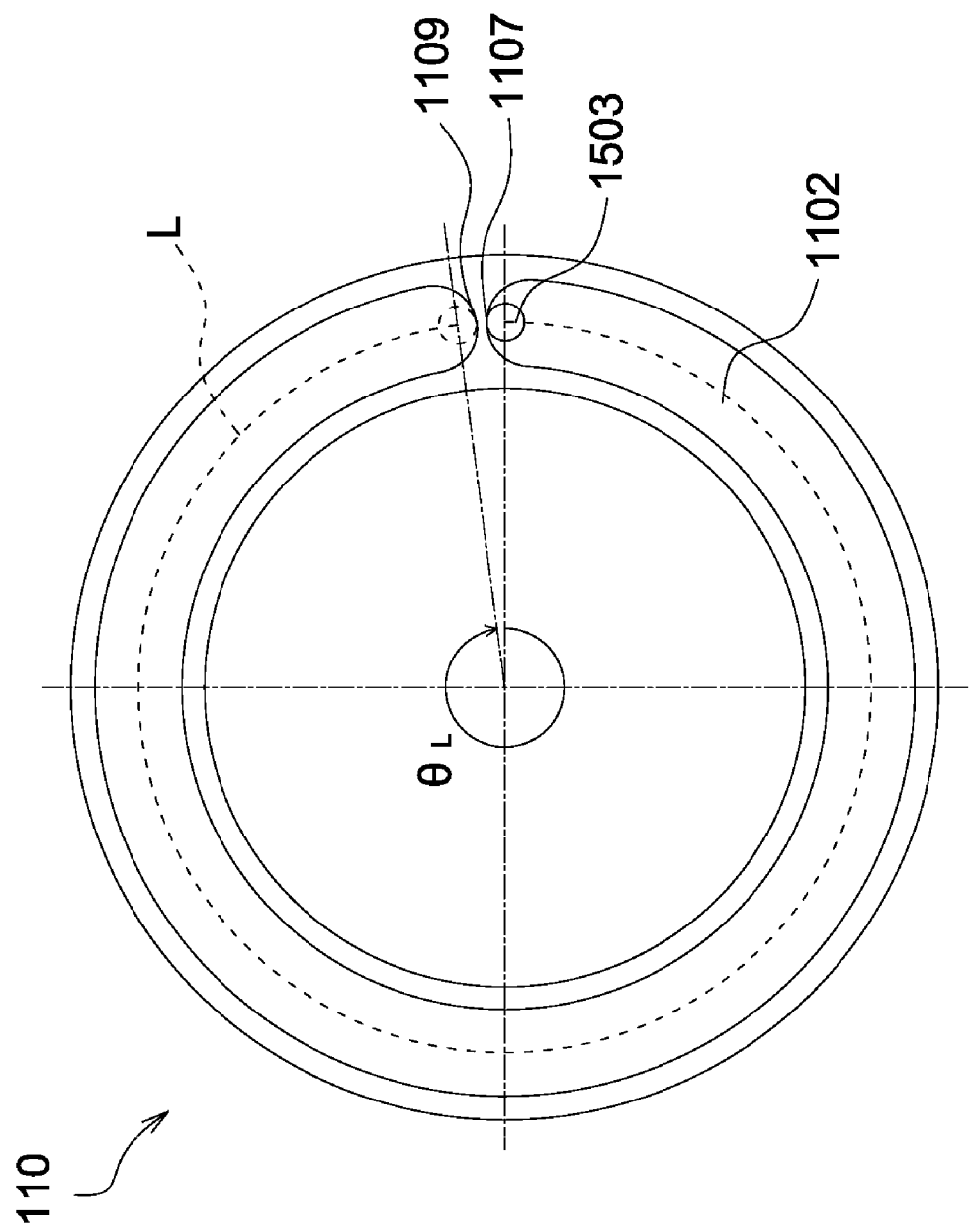
FIG. 7A is a schematic view showing a curved path along which the pin portion of the FIG. 3 moves in the gap and a central angle corresponding to the curved path.
Figure 7B:
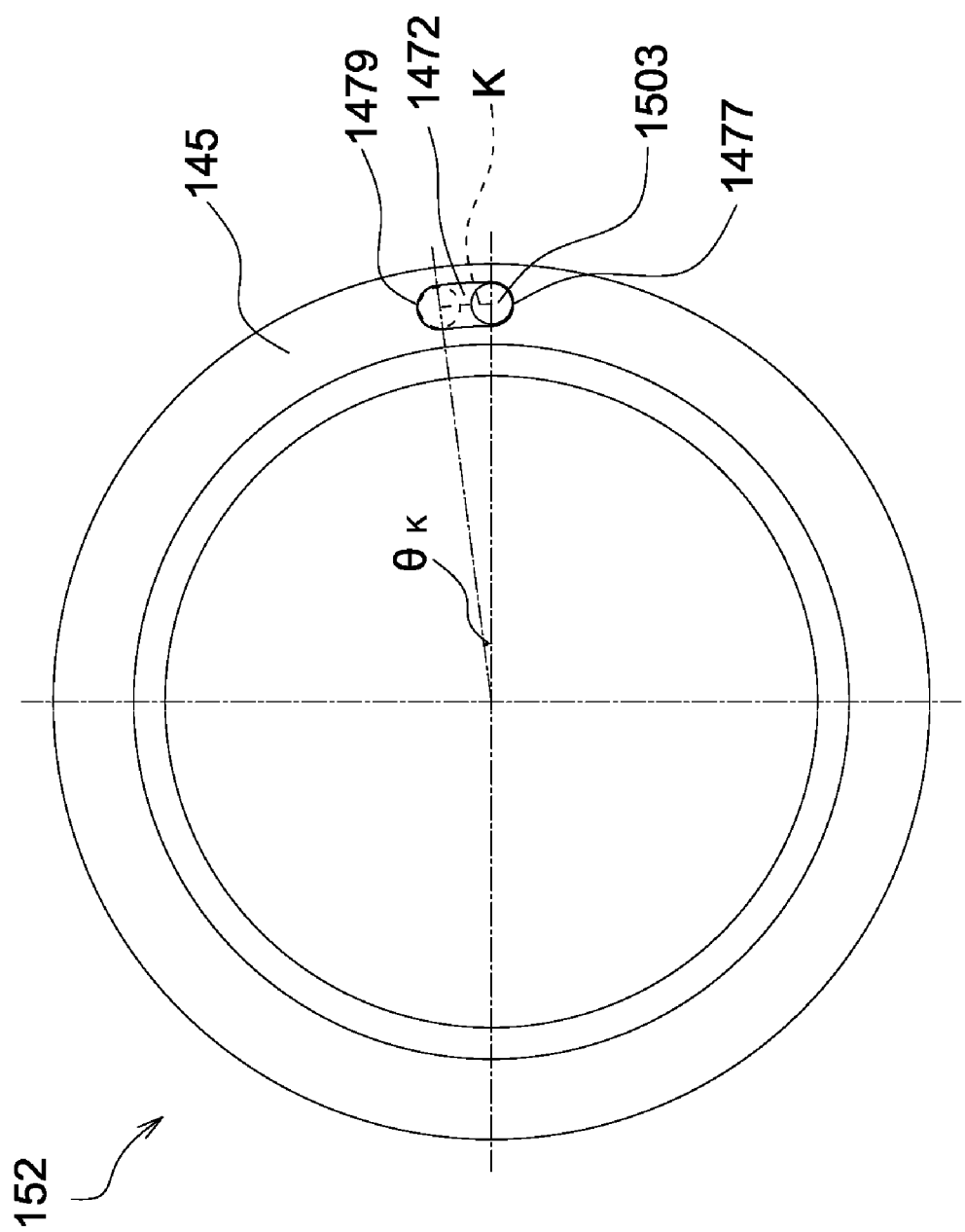
FIG. 7B is a schematic view showing a curved path along which the pin portion of the FIG. 3 moves in the limiting slot and a central angle corresponding to the curved path.

Referring to FIGS. 7A and 7B, when the pin portion 1503 is moved from the first end 1107 to the second end 1109 in the gap 1102 along a first curved path L, the first curved path L corresponds to a first central angle $\theta_L$. That is, the adjusting cap 110 is rotated in the single direction through the first central angle $\theta_L$ relative to the zero-point position. Moreover, the pin portion 1503 is pushed from the third end 1477 to the fourth end 1479 in the limiting slot 1472 along a second curved path K, and the second curved path K corresponds to a second central angle $\theta_K$. As a result, the adjusting cap 110 is rotated in the single direction through the first central angle $\theta_L$ and the second central angle $\theta_K$ (full rotation) relative to the zero-point position, and a sum of the first central angle $\theta_L$ and the second central angle $\theta_K$ is 360 degrees.

In sum, the sight and the compensating mechanism 11 of the invention are capable of achieving the "zero stop" function and are capable of resolving problem that the prior adjusting cap is not capable of rotating through 360 degrees. Since the compensating mechanism 11 is capable of rotating through 360 degrees and is capable of carrying on rotating after the constraint is removed, arrangement and operation of the compensating mechanism 11 are more intuitive to the user. It therefore significantly alleviates the burden that the user needs to remember how many degrees or clicks the compensating mechanism has already experienced by adjustment.

What is claimed is:

1. A compensating mechanism, comprising:
   a base;
   an adjusting unit disposed on the base;
   an adjusting cap connected to the adjusting unit and configured to rotate and move the adjusting unit with respect to the base so as to form a first circumferential movement range; and
   a stop unit connected to the base and comprising a sliding element and a limiting element, wherein the limiting element comprises a limiting portion, the limiting portion comprises a movement region, and the adjusting cap is configured to move the sliding element along the movement region so as to form a second circumferential movement range;
   wherein a sum of a first central angle corresponding to the first circumferential movement range and a second central angle corresponding to the second circumferential movement range is 360 degrees;
   wherein a value of the first central angle differs from that of the second central angle.

2. The compensating mechanism as claimed in claim 1, wherein the adjusting cap comprises a gap, the gap has a first end and a second end, and the adjusting cap is configured to move the sliding element along the gap and between the first end and the second end;
   wherein the limiting portion is a limiting slot, and the sliding element is configured to move along the limiting slot.

3. The compensating mechanism as claimed in claim 2, wherein the limiting slot has a third end and a fourth end, and the sliding element is configured to move along the limiting slot and between the third end and the fourth end.

4. The compensating mechanism as claimed in claim 3, wherein a first curved path along which the sliding element moves from the first end to the second end corresponds to the first circumferential movement range, and a second curved path along which the sliding element moves from the third end to the fourth end corresponds to the second circumferential movement range.

5. The compensating mechanism as claimed in claim 3, wherein the adjusting cap is limited by the sliding element to rotate in a single direction when the sliding element is placed against both the first end of the gap and the third end of the limiting slot.

6. The compensating mechanism as claimed in claim 5, wherein the adjusting cap is limited by the sliding element to rotate in a reverse direction of the single direction when the sliding element is placed against both the second end of the gap and the fourth end of the limiting slot.

7. The compensating mechanism as claimed in claim 2, wherein the stop unit further comprises a stop ring disposed around the base and having a sliding slot, wherein the sliding element comprises a pin portion and a base portion, the base portion is movably disposed in the sliding slot, the pin portion movably penetrates through the limiting slot and into the gap, and the limiting element is firmly disposed on the stop ring.

8. The compensating mechanism as claimed in claim 2, wherein the compensating mechanism is an elevation compensating mechanism or a windage compensating mechanism.

9. The compensating mechanism as claimed in claim 2, further comprising a limiting bolt, an elastic element and a connecting element, wherein the limiting bolt penetrates through the elastic element and the connecting element and is fixed to the adjusting unit, the elastic element is compressed between the limiting bolt and the connecting element in an amount of compression and generates a restoring force, one end of the elastic element is disposed against a flange portion of the limiting bolt, the other end of the elastic element is disposed against a bottom portion of the connecting element, and the connecting element is forced against the adjusting unit by the restoring force.

10. A sight, comprising:
    a main body comprising a first end portion and a second end portion;
    an objective unit connected to the first end portion;
    an ocular unit connected to the second end portion;
    an inner lens barrel disposed within the main body and between the objective unit and the ocular unit and comprising a plurality of lenses, wherein the objective unit, the inner lens barrel and the ocular unit constitute an optical axis; and
    a compensating mechanism as claimed in claim 2;
    wherein the compensating mechanism is disposed on the main body and against outer circumferential surfaces of the inner lens barrel so as to adjust the optical axis.

11. A compensating mechanism, comprising:
    a base;
    an adjusting unit disposed on the base;
    an adjusting cap connected to the adjusting unit and configured to rotate and move the adjusting unit with respect to the base so as to form a first circumferential movement range; and
    a stop unit connected to the base and comprising a sliding element and a limiting element, wherein the limiting element comprises a limiting portion, the limiting portion comprises a movement region, and the adjusting cap is configured to move the sliding element along the movement region so as to form a second circumferential movement range;
    wherein a sum of a first central angle corresponding to the first circumferential movement range and a second central angle corresponding to the second circumferential movement range is a fixed value;
    wherein the adjusting cap comprises a gap, the gap has a first end and a second end, and the adjusting cap is configured to move the sliding element along the gap and between the first end and the second end.

12. The compensating mechanism as claimed in claim 11, wherein the limiting portion is a limiting slot, and the sliding element is configured to move along the limiting slot.

13. The compensating mechanism as claimed in claim 12, wherein the limiting slot has a third end and a fourth end, and the sliding element is configured to move along the limiting slot and between the third end and the fourth end.

14. The compensating mechanism as claimed in claim 13, wherein a first curved path along which the sliding element moves from the first end to the second end corresponds to the first circumferential movement range, a second curved path along which the sliding element moves from the third end to the fourth end corresponds to the second circumferential movement range, and the sum of the first central angle and the second central angle is 360 degrees.

15. The compensating mechanism as claimed in claim 13, wherein the adjusting cap is limited by the sliding element to rotate in a single direction when the sliding element is placed against both the first end of the gap and the third end of the limiting slot.

16. The compensating mechanism as claimed in claim 15, wherein the adjusting cap is limited by the sliding element to rotate in a reverse direction of the single direction when the sliding element is placed against both the second end of the gap and the fourth end of the limiting slot.

17. The compensating mechanism as claimed in claim 12, wherein the compensating mechanism is an elevation compensating mechanism or a windage compensating mechanism.

18. A compensating mechanism, comprising:

a base;

an adjusting unit disposed on the base;

an adjusting cap connected to the adjusting unit and configured to rotate and move the adjusting unit with respect to the base so as to form a first circumferential movement range; and a stop unit connected to the base and comprising a sliding element and a limiting element, wherein the limiting element comprises a limiting portion, the limiting portion comprises a movement region, and the adjusting cap is configured to move the sliding element along the movement region so as to form a second circumferential movement range;

wherein a sum of a first central angle corresponding to the first circumferential movement range and a second central angle corresponding to the second circumferential movement range is a fixed value;

wherein the adjusting cap comprises a gap, the gap has a first end and a second end, and the adjusting cap is configured to move the sliding element along the gap and between the first end and the second end;

wherein the limiting portion is a limiting slot, and the sliding element is configured to move along the limiting slot;

wherein the stop unit further comprises a stop ring disposed around the base and having a sliding slot, wherein the sliding element comprises a pin portion and a base portion, the base portion is movably disposed in the sliding slot, the pin portion movably penetrates through the limiting slot and into the gap, and the limiting element is firmly disposed on the stop ring.

19. A compensating mechanism, comprising:

a base;

an adjusting unit disposed on the base;

an adjusting cap connected to the adjusting unit and configured to rotate and move the adjusting unit with respect to the base so as to form a first circumferential movement range; and a stop unit connected to the base and comprising a sliding element and a limiting element, wherein the limiting element comprises a limiting portion, the limiting portion comprises a movement region, and the adjusting cap is configured to move the sliding element along the movement region so as to form a second circumferential movement range;

wherein a sum of a first central angle corresponding to the first circumferential movement range and a second central angle corresponding to the second circumferential movement range is a fixed value;

wherein the adjusting cap comprises a gap, the gap has a first end and a second end, and the adjusting cap is configured to move the sliding element along the gap and between the first end and the second end;

wherein the limiting portion is a limiting slot, and the sliding element is configured to move along the limiting slot;

wherein the compensating mechanism further comprises a limiting bolt, an elastic element and a connecting element, wherein the limiting bolt penetrates through the elastic element and the connecting element and is fixed to the adjusting unit, the elastic element is compressed between the limiting bolt and the connecting element in an amount of compression and generates a restoring force, one end of the elastic element is disposed against a flange portion of the limiting bolt, the other end of the elastic element is disposed against a bottom portion of the connecting element, and the connecting element is forced against the adjusting unit by the restoring force.

20. A sight, comprising:

a main body comprising a first end portion and a second end portion;

an objective unit connected to the first end portion;

an ocular unit connected to the second end portion;

an inner lens barrel disposed within the main body and between the objective unit and the ocular unit and comprising a plurality of lenses, wherein the objective unit, the inner lens barrel and the ocular unit constitute an optical axis; and a compensating mechanism as claimed in claim 12;

wherein the compensating mechanism is disposed on the main body and against outer circumferential surfaces of the inner lens barrel so as to adjust the optical axis.

* * * * *